United States Patent [19]

Pierson

[11] 4,263,630
[45] Apr. 21, 1981

[54] UNIFORMLY LOADED OPPOSITE MAGNETIC TRANSDUCER ASSEMBLY

[75] Inventor: Dwight L. Pierson, Rochester, Minn.

[73] Assignee: International Business Machines Corporation, Armonk, N.Y.

[21] Appl. No.: 70,452

[22] Filed: Aug. 28, 1979

Related U.S. Application Data

[63] Continuation of Ser. No. 967,330, Dec. 7, 1978, abandoned.

[51] Int. Cl.³ .................... G11B 5/48; G11B 21/16
[52] U.S. Cl. ................................ 360/104; 360/109
[58] Field of Search .................... 360/97–99, 360/104–105, 109, 75, 86

[56] References Cited

U.S. PATENT DOCUMENTS

| | | | |
|---|---|---|---|
| 3,022,494 | 2/1962 | Hansen et al. | 360/109 |
| 3,632,900 | 1/1972 | Kurzweil, Jr. | 360/75 X |
| 3,706,861 | 12/1972 | Giel | 360/75 X |
| 3,943,569 | 3/1976 | Bettini et al. | 360/105 X |
| 4,089,029 | 5/1978 | Castrodale et al. | 360/86 X |

*Primary Examiner*—John H. Wolff
*Attorney, Agent, or Firm*—R. W. Lahtinen

[57] ABSTRACT

A transducer assembly including a pair of transducers positioned directly opposite each other on the two faces of a flexible magnetic disk and a pair of gimbal springs each for supporting one of the transducers. The gimbal springs are so adjustably bent that the transducers bear with substantially equal, opposite and uniform pressures on the opposite sides of the disk. A method is disclosed for measuring the forces exerted by the transducers acted on by the gimbal springs including the positioning of three balls on the active face of each of the transducers with strain gauges measuring the forces on each of the balls. A first one of the balls is located on the transverse center line of the active face of the transducer while the other balls are equally spaced from this center line; and all of the balls are equally spaced from a longitudinal center line of the face. The gimbal spring for the transducer is then adjustably bent until the force from the transducer on the first ball is twice that of the forces provided by the transducer on the second and third balls so that the transducer will bear with uniform pressures on the disk.

3 Claims, 10 Drawing Figures

UNIFORMLY LOADED OPPOSITE MAGNETIC TRANSDUCER ASSEMBLY

This is a continuation of application Ser. No. 967,330 filed Dec. 7, 1978, now abandoned.

BACKGROUND OF THE INVENTION

The invention relates to assemblies of magnetic transducers particularly for use with flexible magnetic disks that undulate from their principal plane during their rotation.

It has been previously proposed in Castrodale et al. U.S. Pat. No. 4,089,029, issued May 9, 1978, to provide a transducer assembly of this type having a pair of transducers held against the opposite faces of a flexible magnetic disk with a pair of gimbal springs. In the ordinary manufacture of the transducer assembly, it was found that the gimbal springs in particular caused the transducers to bear against the disk and against themselves through the intermediary of the disk with non-uniform forces. These non-uniform forces were due to the many various manufacturing steps including heat welding, pressure bonding, chemical etching, and varied handling of the parts during formation and assembling; and any accompanying malformation of the parts of the assembly were not visually apparent. These non-uniform forces resulted in vibration of the transducers, movements of the transducers from their intended magnetic tracks on the disk and other misfunctions so that data transfer was unreliable particularly for very high speeds of rotation of the disk and for very high track densities.

SUMMARY OF THE INVENTION

It has been found that the misfunctions above-mentioned may be obviated by balancing the opposite transducers with respect to each other so that the transducers bear with substantially equal, opposite and uniform pressures on the disks.

It is therefore an object of the invention to provide improved gimbal springs for such a pair of transducers in a transducer assembly in which the gimbal springs are so adjustably bent that they cause the transducers to bear with uniform and equal pressures on the two opposite sides of the disk.

It is also an object of the invention to provide an improved method for adjusting the gimbal springs carrying the two transducers, particularly by measuring the forces at three places on an active surface of each of the transducers so that, when the transducers are put in assembly, they provide the same uniform opposite pressures on the disk and on each other through the intermediary of the disk.

DESCRIPTION OF THE PRIOR ART

It has been previously proposed in U.S. Pat. No. 4,089,029, issued May 9, 1978, that two spring loaded transducers may be used on the opposite sides of a flexible magnetic disk; and it was found in actual practice that, with the usual manufacturing techniques available at the time, the loadings on the transducers varied considerably over their active forces with resultant undesired discontinuities and other irregularities in data transfer.

Figure 1:
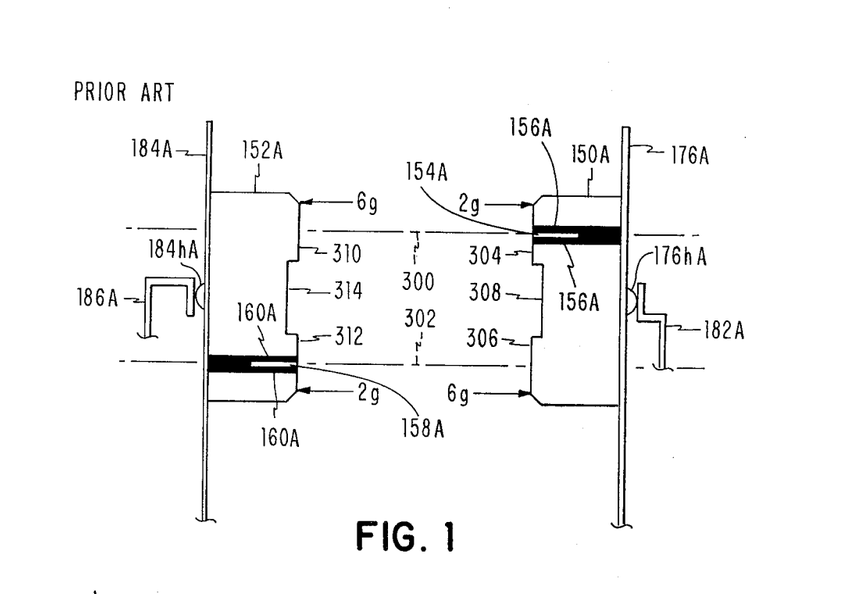
FIG. 1 is a side elevational view of a pair of prior art gimbal spring supported magnetic transducers showing various loadings on the transducers by the gimbal springs.
Figure 2:
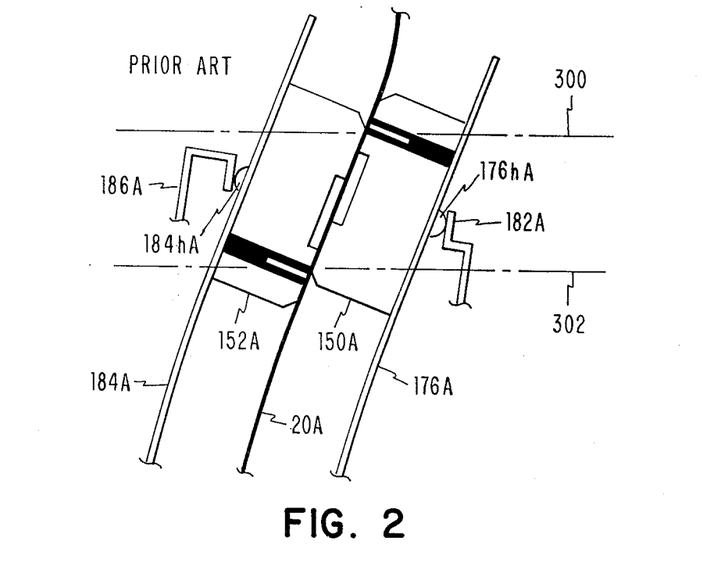
FIG. 2 is a side elevational view of the prior art transducers of FIG. 1 showing the transducers in contact except for the existence of a flexible magnetic disk between them.

Two such non-uniformly loaded transducers 150A and 152A in the prior art are shown as an example in FIGS. 1 and 2 hereof. The reference numerals used in FIGS. 1 to 5 hereof for various illustrated parts are the same as the reference numerals for corresponding parts in U.S. Pat. No. 4,089,029 but with the suffix "A" for each reference numeral being used in FIGS. 1 to 5 hereof. The transducers 150A and 152A are mounted on gimbal springs 176A and 184A, and dimples 176hA and 184hA are used in connection with the load arms 182A and 186A to provide universal joint mountings for the transducers 150A and 152A. The transducer 150A has a read/write magnetic core 154A and a pair of spaced erase cores 156A, and the transducer 152A has a read/write magnetic core 158A and a pair of erase magnetic cores 160A. The cores 154A and 158A respectively correspond to magnetic tracks having center lines 300 and 302 on a flexible magnetic disk 20A. The transducer 150A is provided with a pair of lands 304 and 306 that are adapted to having sliding contact with the magnetic disk 20A, and a slot 308 is provided between the lands 304 and 306. The slot 308 and lands 304 and 306 extend in the direction of movement of the disk 20A on the transducer 150A. The transducer 150A is so positioned on the disk 20A that the land 306 is located farther outward on the disk than the land 304. The transducer 152A is provided with corresponding lands 310 and 312 and slot 314. The slots 308 and 314 are substantially centered with respect to the upper and lower edges of the transducers as they are shown in FIG. 1.

Due to an original improper shape of the gimbal spring 176A when unloaded, the transducer 150A when loaded by force applied to dimple 176hA by load arm 182A and with its lands 304 and 306 in a vertical plane (which would be the case in the proper disk engaging position of the transducer 150A with the disk 20A being in a vertical plane), the transducer 150A by its lands provides a non-uniform force such as on the disk 20A.

At the upper edge of the land 304, the transducer would provide two grams of force, while at the lower edge the land 306 would provide six grams of force as indicated in FIG. 1. Due to the original, unloaded, improper shape of the gimbal spring 184A, the transducer 152A would provide six grams of force at the upper edge of the land 310 and two grams of force at the lower edge of the land 312 as is indicated in FIG. 1. These forces can of course vary and are just indicative of the corresponding non-uniform pressure loading by the transducers on the disk 20A.

When the two opposing transducers 150A and 152A as thus improperly loaded by springs 176A and 184A are brought together against the rotating disk 20A, the core 154A and therefore the read/write gap in this core are not on the track center line 300 as would be proper, and the core 158A and the read/write gap in this core are not on the track center line 302 as would be proper. This is because this imbalance of forces has caused the transducers 150A and 152A to rotate about their pivot points on the dimples 176hA and 184hA and away from the track center lines 300 and 202. The disk 20A beneath the transducers 150A and 152A is thus bent out of its proper vertical plane, and the positions of the transducers and disk are shown in FIG. 2, with the skewed positions of the disk and transducers being exaggerated for better understanding. If the transducers 150A and 152A had been loaded by the gimbal springs 176A and 184A with uniform forces on disk 20A, their lands 304, 306, 310 and 312 would have been vertical in the FIG. 2 showing; and the disk 20A, which is of flexible material, would not be shoved out of a vertical plane. Since the cores 154A and 158A are not on the track center lines 300 and 302, the transducers 150A and 152A do not write in the proper locations on the disk 20A; and reading errors occur with respect to previously written tracks on the track center lines 300 and 302. The skewed positions of the transducers 150A and 152A and of the disk 20A shown in FIG. 2 also can cause excessive wear of the disk 20A.

Figure 3:
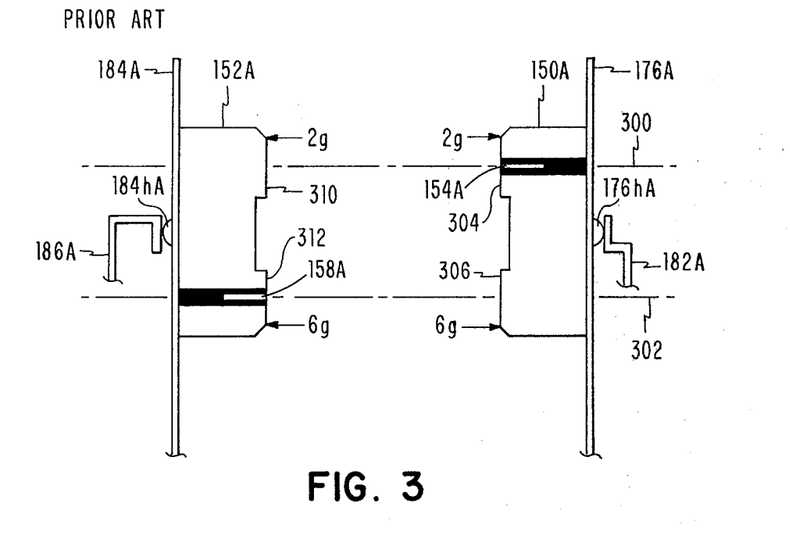
FIG. 3 is a side elevational view of the prior art transducers shown in FIG. 1 but with different loadings on the transducers by the gimbal springs.
Figure 4:
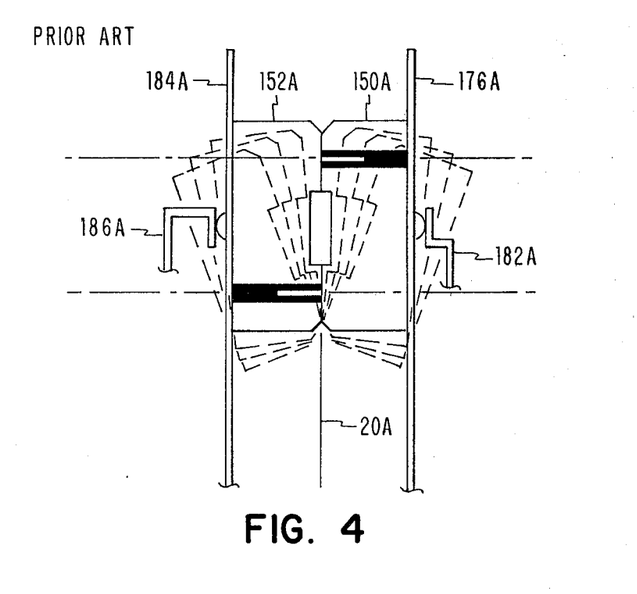
FIG. 4 is a side elevational view of the prior art transducers of FIG. 3 positioned in contact with each other except for the existence of a magnetic disk between them and showing the vibration of the transducers.

FIGS. 1 and 2 show the example of improper loading of the transducers 150 and 152A by the springs 176A and 184A in which the upper opposite edges of the transducers respectively apply relatively large and small forces to the disk 20A; and FIGS. 3 and 4 show another type of transducer loading imbalance due to the improper original unloaded shapes of springs 176A and 184A in which the imbalance is the same type for both transducers 150A and 152A. For both transducers shown in FIG. 3, the high loading is at the lower edge and the low loading is at the upper edge as shown in this figure. Specifically, in the FIG. 3 example, the transducers 150A and 152A provide forces of two grams at the upper edges of the lands 304 and 310, and the lands 306 and 312 provide forces of six grams at their lower edges.

The FIG. 3 loading of the transducers 150A and 152A causes the transducers to vibrate as is indicated in FIG. 4 particularly at their edges located farther inward on the disk 20A shown as the upper edges in FIGS. 3 and 4 during rotation of the disk 20A. This causes excessive signal modulation from a magnetic track read by transducer 150A (which is the transducer having its read-write core adjacent the upper edge of the transducer) because there is not sufficient loading to hold the transducers 150A and 152A against the disk 20A at their upper edges. This condition also causes excessive wear on the disk 20A at the lower edges of the transducers 150A and 152A where the higher loading occurs. The reverse conditions would occur if the forces were reversed, with the lower edges of the transducers 150A and 152A having the higher loadings.

Figure 5:
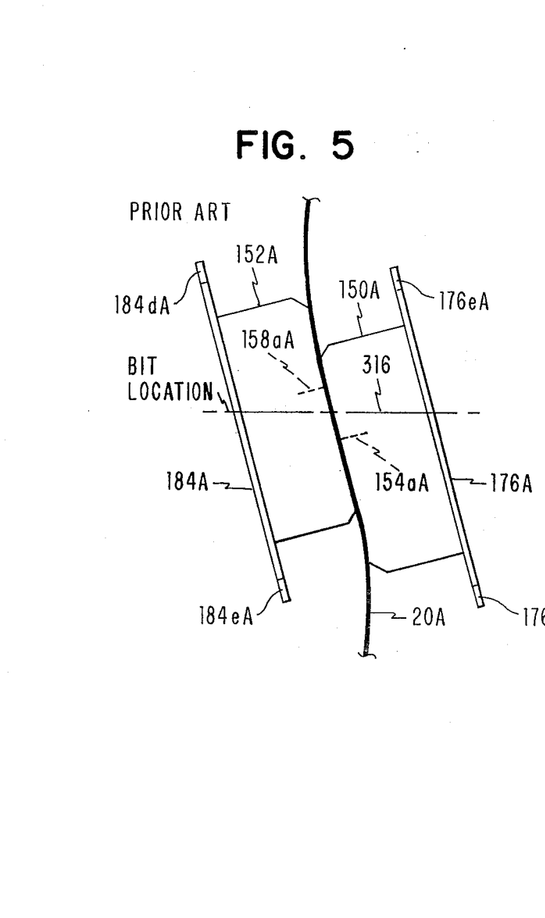
FIG. 5 is a top plan view of the prior art transducers shown in the previous figures but with different loadings on the transducers by the gimbal springs.

FIG. 5 shows a top view of the transducers 150A and 152A which are imbalanced in still another way. In the case shown in FIG. 5, the supporting side spring legs 176eA and 184eA are more strongly loading the associated transducers 105A and 152A than are the legs 176dA and 184dA. With this type of imbalance, the magnetic gaps 154aA and 158aA are out of their proper locations on bit location line 316 on the disk 20A. This condition can cause excessive signal modulation and loss of signal amplitude during reading and also may cause excessive wear of the disk 20A.

DESCRIPTION OF THE PREFERRED EMBODIMENT

Figure 6:
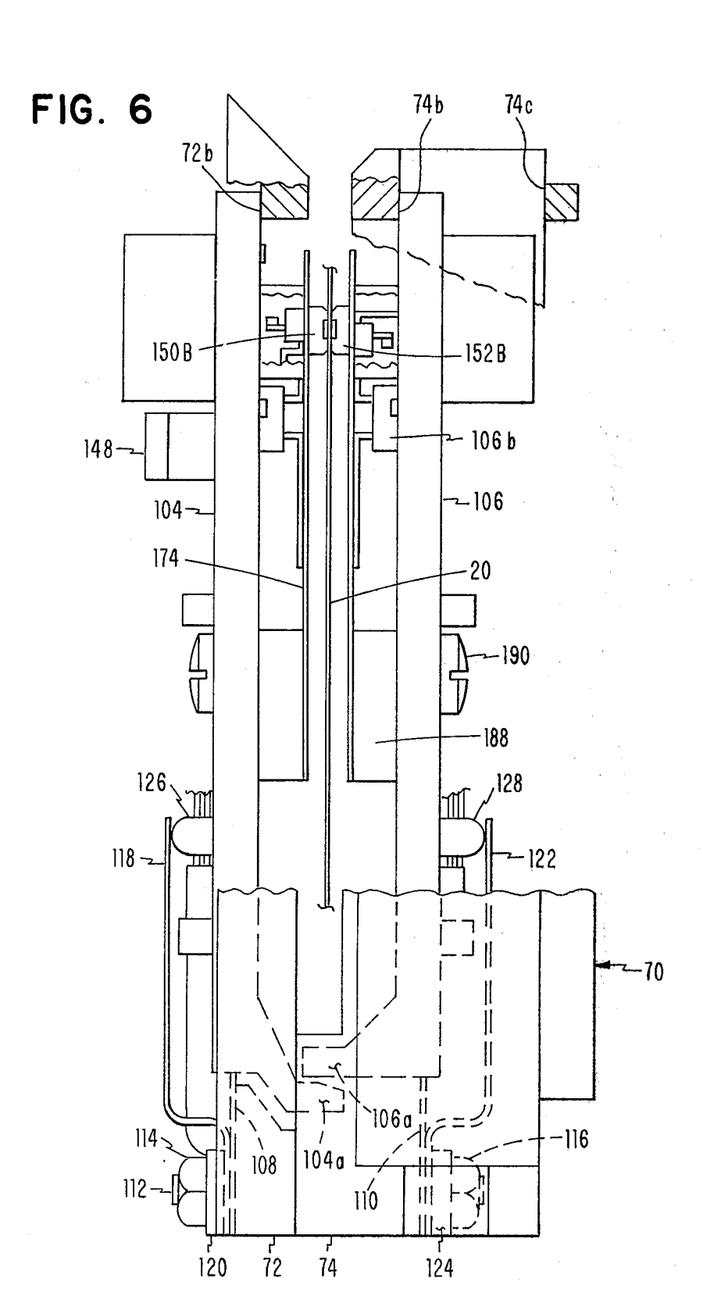
FIG. 6 is a side elevational view of a transducer carriage embodying the principles of the invention.

FIG. 6 shows a transducer carriage assembly 70 of data storage apparatus in which two magnetic transducers 150B and 152B are disposed opposite each other and bear with substantially uniform pressures on a magnetic disk 20 which is drivably rotated about its center. The data storage apparatus herein disclosed is substantially the same as that disclosed in U.S. Pat. No. 4,089,029 except for the transducers 150B and 152B herein and the adjustment of their supporting structure. The transducers 150B and 152B herein correspond to the transducers 150 and 152 of U.S. Pat. No. 4,089,029, and otherwise the same reference numerals herein and in said patent refer to like parts.

The assembly 70 includes the two arms 104 and 106 which are swingably mounted with respect to carriage parts 72 and 74 by means of leaf springs 108 and 110. A hook 148 is fixed on the swing arm 104 so that the arm may be swung outwardly with respect to the carriage part 72, and the swing arms 104 and 106 have portions 104a and 106a by means of which the arm 106 is swung outwardly substantially at the same time as and under the impetus of the arm 104. For this purpose, the arm portion 104a underlies the arm portion 106a as shown in FIG. 6. The arms 104 and 106 have protrusions 126 and 128, and leaf return springs 118 and 122 bear on these protrusions for moving the swing arms 104 and 106 toward each other. Threaded bolts 112 and nuts 114 and 116 thereon hold the carriage parts 72 and 74, springs 118, 108, 110 and 122 and washer plates 120 and 124 fixed with respect to each other. The parts 72 and 74 are provided with abutment surfaces 72b and 74b for limiting the swings of the arms 104 and 106 toward each other, and the part 74 is also provided with an abutment surface 74c for limiting the outward swing of the arm 106.

Figure 7:
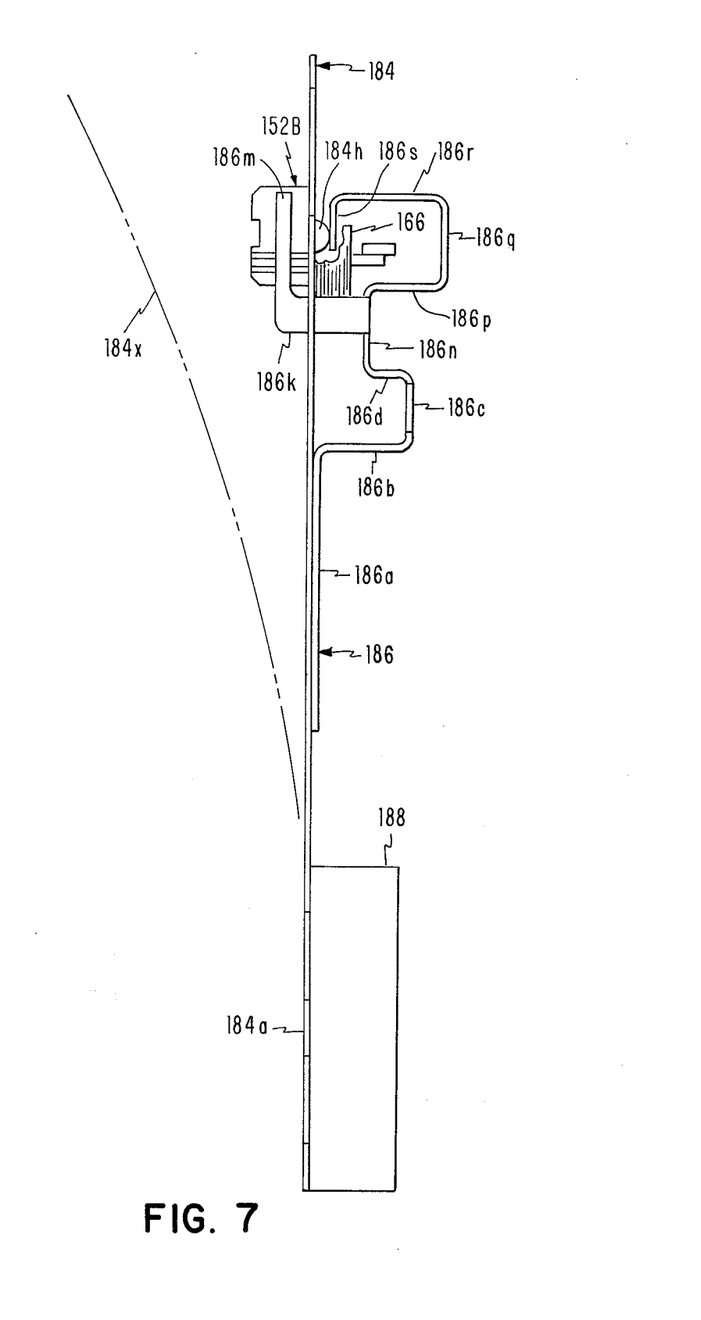
FIG. 7 is a side elevational view on an enlarged scale showing a gimbal spring and load arm support for one of the transducers shown in FIG. 6.
Figure 8:
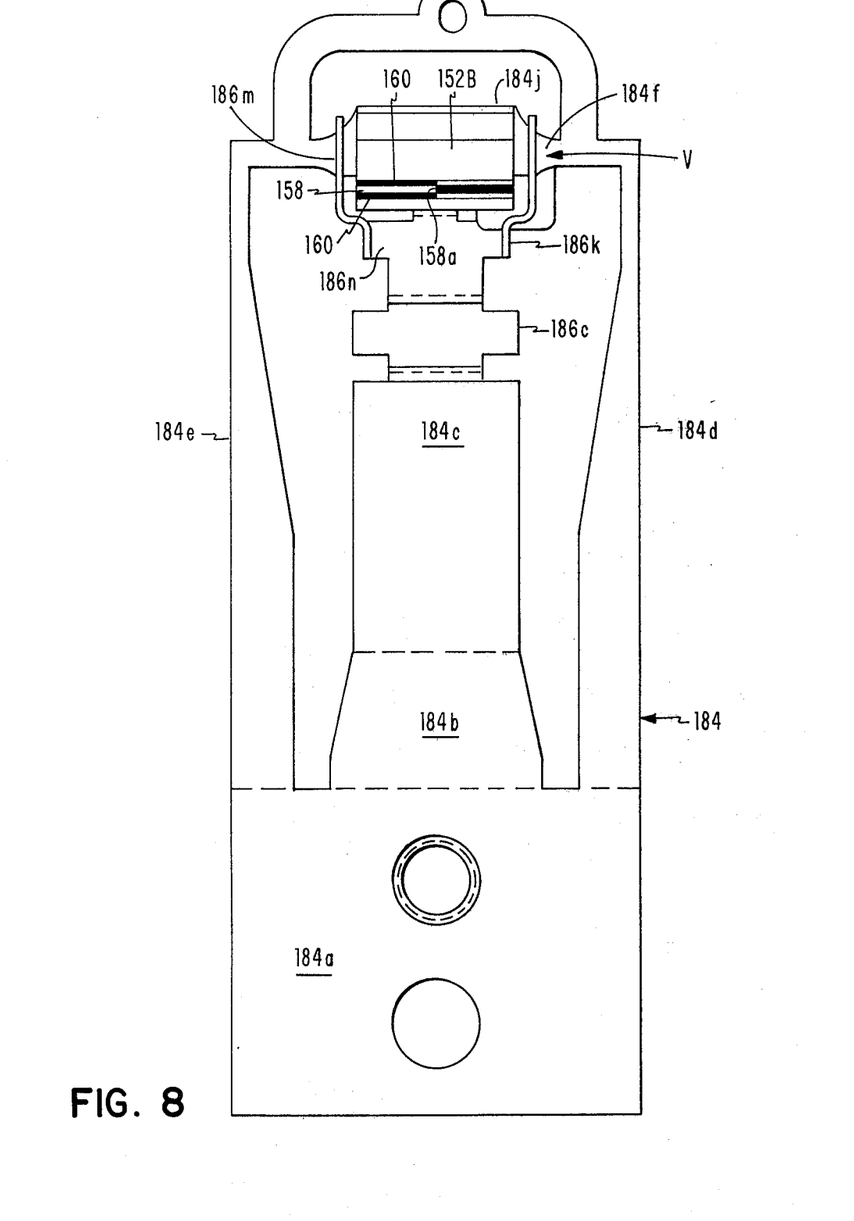
FIG. 8 is a front elevational view of the spring and load arm support shown in FIG. 7.

FIGS. 6, 7 and 8 show the mounting for the transducer 152B with respect to the swing arm 106 which includes a gimbal spring 184 and load arm 186. The gimbal spring 184 is mounted with respect to the swing arm 106 by means of the gimbal spring part 184a and by means of a block 188 and a screw 190 extending through the swing arm 106 into the block 188. The gimbal spring 184 also includes the middle portions 184b and 184c by means of which the load arm 186 is mounted on the spring 184, relatively narrow leg portions 184d and 184e, transversely extending outer portions 184f and a relatively wide middle portion 184j on which the transducer 152B is fixed. The load arm 186 having the parts 186a–186s is fixed to the gimbal spring 184 in the manner illustrated in U.S. Pat. No. 4,089,029, and the part 186s supported by the part 186r bears against a dimple 184h formed in the gimbal spring 184 so as to provide a type of universal joint between the load arm 186 and the gimbal spring 814 and transducer 152B. The load arm 186 includes the wing portions 186c cooperating with arm portions 106b of arm 106 and includes fingers 186m cooperating with adjacent parts of the gimbal spring 184 which function as lost motion connections to pull the transducers 152B and 150B apart with corresponding swinging movement of the arms 104 and 106. The gimbal spring leg portions 184d and 184e have no discernable bend in them, but the gimbal spring portion 184b does; and the latter produces the shape 184x of the gimbal spring 184 if the lost motion connection provided by the wing portions 186c and arm portions 106b were ineffective.

The support structure for the transducer 150B is much the same as that just described for the transducer 152B, and U.S. Pat. No. 4,089,029 may be referred to for details of such structure.

The transducer 152B is shown in greater detail in FIGS. 9 and 10 and has the central groove 314 separating the lands 310 and 312 as previously described in connection with FIGS. 1–5. The lands 310 and 312 make contact or very near contact with the disk 20 as the disk moves across the transducer 152B, this being in the direction V shown in FIG. 8; and the lands form the active transducer face 152p. The transducer 150B is slotted similarly to the transducer 150A as shown in FIG. 1.

The transducers 150B and 152B bear with substantially equal and opposite forces on the disk 20 from their outer edges to their inner edges on the disk 20 (from their lower edges to their upper edges respectively as the transducers are shown in FIG. 6) and from one end to the other end of each (in the direction V as the transducer 152B is shown in FIG. 8). The transducers 150B and 152B thus do not have the variations in disk contact that have been described in connection with the transducers 150A and 152A in connection with FIGS. 1–5; and the read/write gaps, such as the gap 158a shown in FIG. 8, remain in continuous, constant and uniform pressure and contact with the disk 20 so that the data transfer from and to the disk 20 is continuous and reliable. As is explained in U.S. Pat. No. 4,089,029, the two opposite transducers bear against each other and load each other through the disk 20, with the gimbal springs 174 and 184 exerting pressure on the transducers by virtue of being moved out of their uninhibited positions, such as the position 184x for the gimbal spring 184 shown in FIG. 7. This substantially uniform loading of each of the transducers 152A and 152B on each other through the medium of the thin flexible magnetic disk 20 and on the disk 20 itself is obtained by adjustably bending the supporting gimbal springs for the transducers, such as the gimbal spring 184 for the transducer 152B, and in particular by adjustably bending the narrow legs of the springs, these being the legs 184d and 184e for the spring 184.

Figure 9:
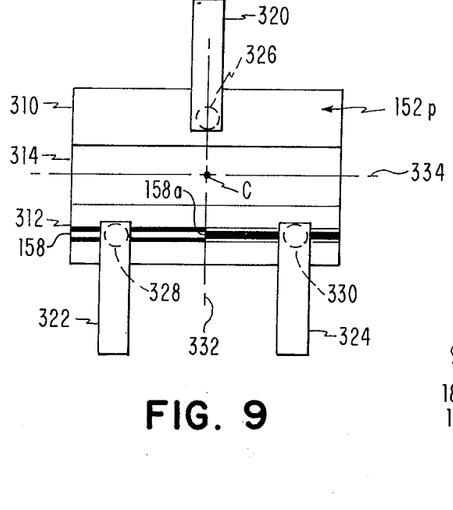
FIG. 9 is a plan view of one of the transducers shown in FIGS. 7 and 8 and of load measuring mechanism used in connection with the transducer.
Figure 10:
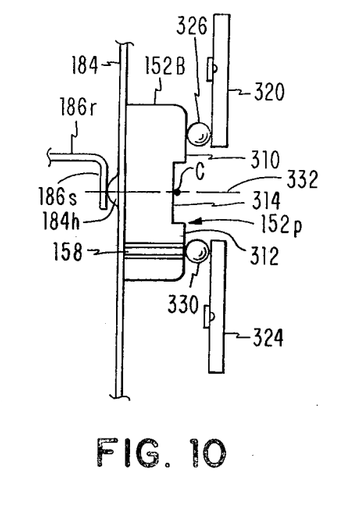
FIG. 10 is an end elevational view of the transducer and load measuring mechanism shown in FIG. 9.

A substantially uniform loading of the transducer 152B may be assured by using the three strain gauges 320, 322 and 324 shown in FIGS. 9 and 10 which measure the forces exerted by the transducer 152B. Steel balls 326, 328 and 330 are disposed beneath the strain gauges 320, 322 and 324 respectively. The balls 328 and 330 bear on land 312 and are equally spaced from the vertical center line 332 passing through the center C of the transducer 152B. The center C incidentally is in alignment with the dimple 184h and read/write gap 158a. The balls 328 and 330 are also equally spaced from the horizontal center line 334 which is parallel with the edges of the slot 314 and passes through the center C of the transducer. The ball 326 bearing on land 310 is spaced the same distance from the horizontal center line 334 as are the balls 328 and 330 and is located on the vertical center line 332.

The measurement of forces exerted by the transducer 152B using the strain gauges is done with the transducer 152B, the gimbal spring 184, the load arm 186 and the swing arm 106 assembled together as seen in FIG. 6. The swing arm 106 is vertical, and the balls 326, 328 and 330 hold the transducer lands 310 and 312 vertical. As may be observed from FIG. 6, in the completed assembly as shown in FIG. 6, the plane of the disk 20 is also vertical as are the surface of the block 188 on which the gimbal spring 184 is mounted and the inner surface of the swing arm 106 on which the block 188 is mounted. At the time of measurement, the lost motion connections including the parts 106b and 186m are open so that the only force applied onto the transducer 152B is by the gimbal spring 184 both by itself and through load arm 186. The gimbal spring 184 is stressed from its uninhibited position 184x by the forces from the balls 326, 328 and 330.

If the force on the ball 326 from the transducer 152B as determined by the strain gauge 320 is twice the force exerted by the transducer 152B on each of the balls 328 and 330 and if the forces exerted by the transducer 152B on the two balls 328 and 330 are equal, then the transducer 152B exerts a uniform pressure and force for its complete active face 152p. This is true since the balls 326, 328 and 330 are equally spaced from the center line 334, since the balls 328 and 330 are equally spaced from the center line 332 and since the ball 326 is on the center line 332. The forces at the four corners of the transducer face 152p are substantially equal; the forces on opposite edges of the transducer face 152p are substantially equal; and the forces effective on the disk 20 are substantially uniform for the complete surfaces of the lands 310 and 312 when the swing arm 106 assembly is used as shown in FIG. 6. This is the desirable, not visually apparent, condition to avoid the difficulties mentioned above in connection with FIGS. 1–5, and if the transducer 152B does not exert these forces on the balls 326, 328 and 330, bending adjustment is made of the gimbal spring 184 and particularly of its legs 184d and 184e.

If the forces applied by the transducer 152B on the two balls 328 and 330 are not substantially equal, then the transducer 152B is twisted with respect to the block 188, and this amounts to a differential twisting of the two gimbal spring legs 184d and 184e. This twisting adjustment is continued until the two strain gauges 322 and 324 indicate that the forces exerted on the two balls 328 and 330 are substantially equal.

If the force exerted on the ball 326 is not substantially twice the forces exerted on each of the balls 328 and 330, then the two gimbal spring legs 184d and 184e are bent simultaneously with respect to the block 188 so that the force exerted on the ball 326 does become substantially twice the forces exerted on each of the balls 328 and 330. It is apparent that for a uniform loading of the transducer 152B, the force on the ball 326 should be twice the forces on each of the balls 328 and 330, since the single ball 326 is above the center line 334 for a certain distance, while the two balls 328 and 330 are below the center line 334 for this same distance and thus balance against the single ball 326.

The transducer 150B is provided with a substantially uniform loading on the disk 20 and on the transducer 152B in the same manner as the transducer 152B has been provided with this uniform loading, using the strain gauges 320, 322 and 324 and the balls 326, 328 and 330 placed as shown and described. In particular, the gimbal spring 174 for the transducer 150B is adjustably bent (in a manner similar to the bending of the gimbal spring 184) so that the transducer 150B bears on the balls 326, 328 and 330 with the same forces as the transducer 152B was effective to provide on these balls, the force on the ball 326 being twice the forces on each of the balls 328 and 330. After both of the gimbal springs 184 and 174 have been adjustably bent to provide this uniform loading of the transducers 150B and 152B, the swing arms 104 and 106 together with the gimbal springs 174 and 184 and the two transducers 150B and 152B are put into full assembly as shown in FIG. 6. The two transducers 150B and 152B are then substantially opposite each other, with the center C of the active face 152p of the transducer 152B being substantially opposite the center of the active face of the transducer 150B and with the four corners of the transducer 152B being substantially directly opposite the four corners of the transducer 150B. The dimple 184h is directly opposite the center C on a line 332 normal to the plane of the bosses 310 and 312, and the dimple 184h is positioned directly opposite the corresponding dimple for the transducer 150B which is also on this normal line 332 (see FIG. 10).

With the carriage assembly 70 being complete, when the swing arms 106 and 104 are moved to the limits of their movement toward each other against the stop surfaces 72b and 74b, the transducers 150B and 152B bear against each other and against the disk 20 with substantially uniform forces, since the transducers 150B and 152B are in their same vertical positions as when the strengths of the gimbal springs 174 and 184 were tested using the strain gauges 320, 322 and 324 and the balls 326, 328 and 330. With this uniform loading, the transducers 150B and 152B consistently track on their intended magnetic tracks, with consistent and reliable data transfer.

Having thus described the invention, what is claimed as new, and desired to be secured by Letters Patent is:

1. In a method of adjusting the forces applied by a transducer on its active face due to a gimbal spring carrying the transducer and carried by a support spaced from the transducer, said spring comprising a pair of relatively thin, flexible leg portions extending generally in the same direction and fixed at ends thereof to the support and the gimbal spring including a portion bridging the other ends of said leg portions on which said transducer is mounted, said transducer having an active face which is adapted to contact a moving magnetic medium and which has active flat face portions located on both sides of a first center line extending through the center of said active face and also located on both sides of a second center line extending through said center of the active face and perpendicular to said first center line, the steps which comprise:

holding said support fixed, moving said transducer against the flexing action of said flexible leg portions to bring said active flat face portions into a certain plane with said support remaining in a fixed position, determining the amount that the magnitudes of moments of forces about said two center lines differ from a certain magnitude of moment by measuring and comparing the forces at a plurality, more than two, points on said active face of the transducer with its said active face portions held in said plane against the forces from said flexible leg portions on said transducer and with said support remaining in its fixed position, two of said points being on opposite sides of said first center line and spaced from said second center line on one side thereof and another of said points being on the other side of said second center line, and bending said flexible leg portions so that they take a permanent set from other than their original shapes to provide changed and equal moments of forces about said two center lines by said flexible leg portions as indicated by said determining of moments and measuring and comparing of forces as aforesaid.

2. In a method of adjusting the forces applied by a transducer on its active face due to a gimbal spring carrying the transducer and carried by a support spaced from the transducer, said spring comprising a pair of relatively, thin, flexible leg portions extending generally in the same direction and fixed at ends thereof to said support and the gimbal spring including a portion bridging the other ends of said leg portions on which said transducer is mounted, said transducer having an active face which is adapted to contact a moving magnetic medium and which has active flat face portions located on both sides of a first center line extending through the center of said active face and also located on both sides of a second center line extending said center of the active face and perpendicular to said first center line, the steps which comprise:

holding said support fixed, moving said transducer against the flexing action of said flexible leg portions to bring said active flat face portions into a certain plane with said support remaining in a fixed position, measuring the forces at three points on said active face of the transducer with its said active face portions held in said plane against the forces of said flexible leg portions and with said support remaining in its fixed position, said points being equally spaced from said second center line and a first one of said points being located on one side of said second center line and on said first center line, said second and third points being located on the other side of said second center line and on opposite sides of said first center line and equally spaced from said first center line, and bending said flexible leg portions so that they take a permanent set from other than their original shapes so that said measured forces at said second and third points have the same magnitudes and the force at said first point has a magnitude of twice the force magnitudes at said second and third points.

3. A transducer assembly for use with a thin flexible movable planar magnetic medium comprising:

a pair of transducers having active faces adapted to contact opposite faces of the moving magnetic medium in registry with each other and each of which has active flat face portions located on both sides of a first center line extending through the center of said active face and also located on both sides of a second center line extending through said center of the active face and perpendicular to said first center line, a support spaced from said transducers, and a gimbal spring connecting each of said transducers with said support, said gimbal springs for said two transducers extending about parallel with each other from said support to said transducers and about parallel with the plane of said medium, each of said gimbal springs comprising a pair of relatively thin flexible leg portions extending generally in the same direction and fixed at ends thereof to said support and comprising a portion bridging the other ends of said leg portions on which the respective transducer is mounted, each of said flexible leg portions being adjustably bent to have a permanent set to other than its original shape by at least one of a twisting of said gimbal spring flexible leg portions about the axis of symetry of said gimbal spring to alter the pitch of the attached transducer and a bending of said gimbal spring flexible leg portions about an axis perpendicular to the plane of symetry and parallel to the major surfaces of said gimbal spring flexible leg portions to alter the roll of the attached transducer to provide equal moments of forces by said flat face portions of the transducers about said center lines of the transducers when said active transducer faces are in contact with each other except for the existence of the thin flexible medium between them, the equal moments of force are as certained by more than two pressure sensing means whose relative magnitudes bear a predetermined relationship so as provide a uniform contact pressure between transducers and flexible medium.

* * * * *